United States Patent [19]

Carcia et al.

[11] 4,306,786

[45] Dec. 22, 1981

[54] PHOTOGRAPHIC EXPOSURE CONTROL WITH SCENE LIGHT INTEGRATION LEVEL DETERMINED AS FUNCTION OF PRE-EXPOSURE AMBIENT SCENE LIGHT DETECT

[75] Inventors: Peter P. Carcia, Reading; Arthur N. Woodbury, Acton, both of Mass.

[73] Assignee: Polaroid Corporation, Cambridge, Mass.

[21] Appl. No.: 218,448

[22] Filed: Dec. 19, 1980

[51] Int. Cl.³ .............................................. G03B 7/097
[52] U.S. Cl. .................................... 354/23 D; 354/29; 354/59; 354/60 R
[58] Field of Search .................. 354/23 D, 26, 29, 30, 354/42, 49, 59, 60 R

[56] References Cited

U.S. PATENT DOCUMENTS

| | | | |
|---|---|---|---|
| 3,200,723 | 8/1965 | Topaz | 354/34 |
| 3,620,143 | 11/1971 | Burgarella | 354/49 |
| 3,942,183 | 3/1976 | Whiteside | 354/29 |
| 4,008,481 | 2/1977 | Whiteside | 354/27 |
| 4,040,172 | 8/1977 | Johnson et al. | 354/173 |
| 4,192,587 | 3/1980 | La Rocque et al. | 354/27 |

Primary Examiner—Michael L. Gellner
Attorney, Agent, or Firm—Edward S. Roman

[57] ABSTRACT

A photographic exposure control system provides for the termination of an exposure interval as a predetermined function of the scene light detected during the exposure interval wherein at least one parameter of the predetermined function is varied as another function of the ambient scene light detected prior to the exposure interval. The predetermined function may comprise the integration of the detected scene light to a selected level wherein the selected level of integration is the one parameter varied as a function of the ambient scene light detected prior to the exposure interval.

12 Claims, 13 Drawing Figures

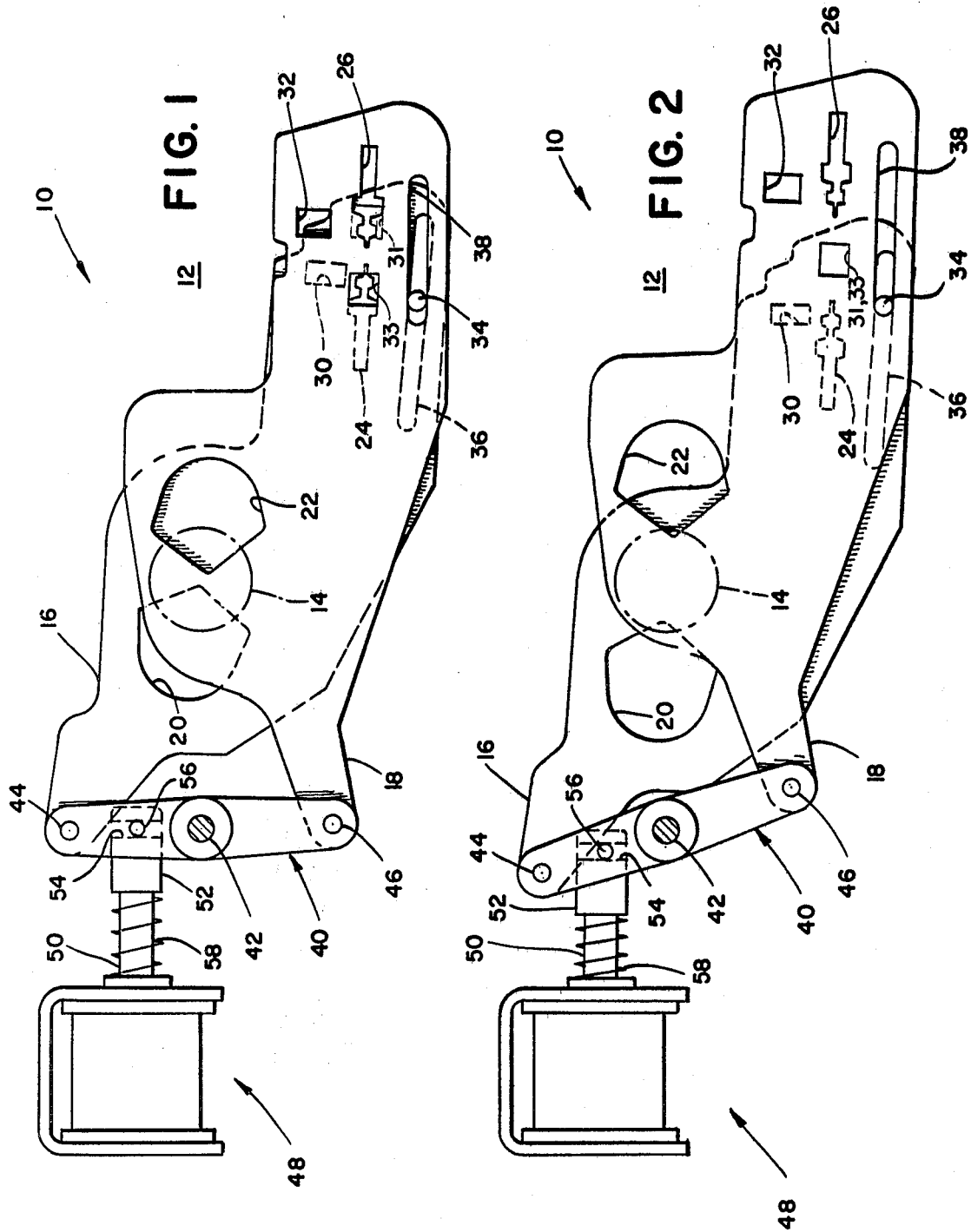

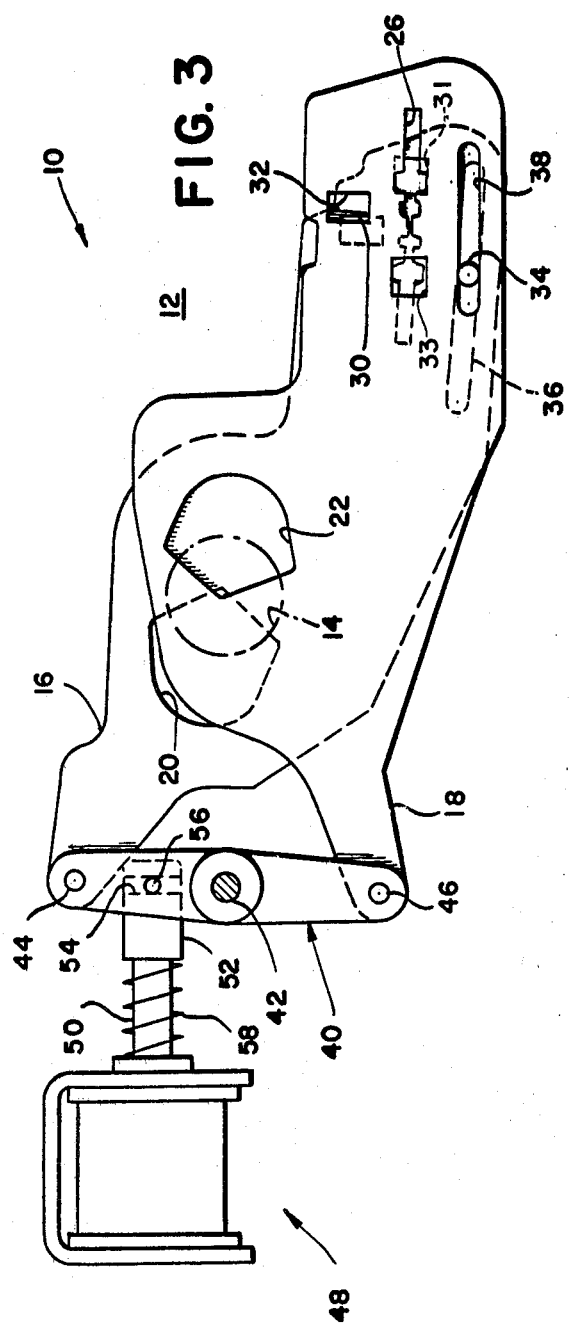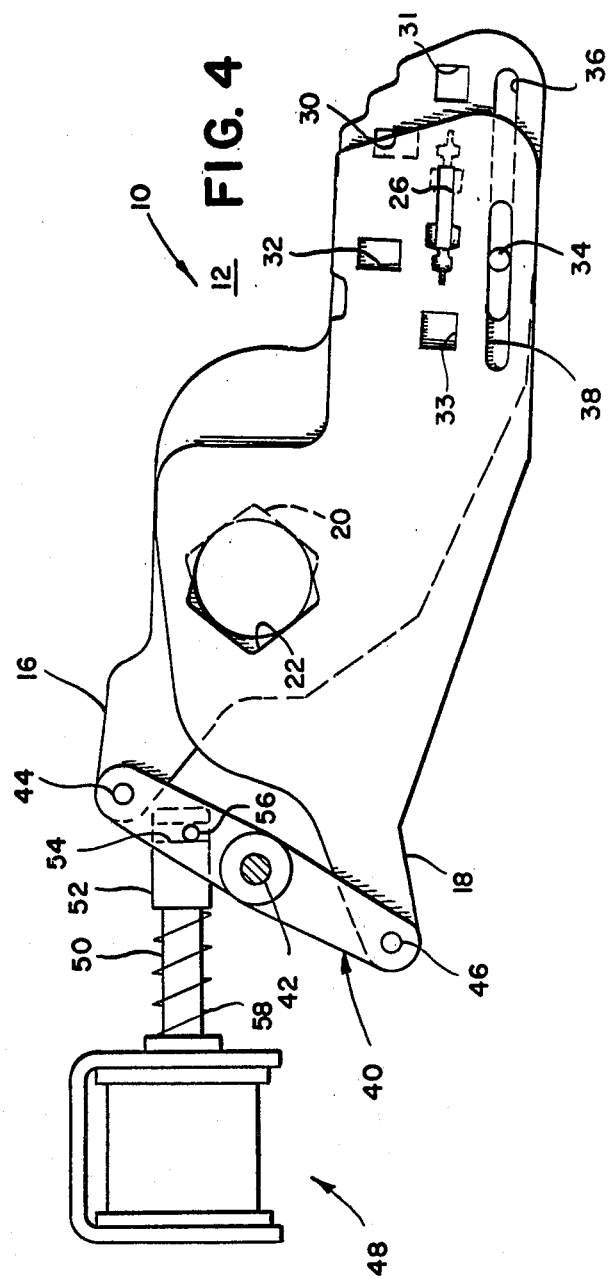

PHOTOGRAPHIC EXPOSURE CONTROL WITH SCENE LIGHT INTEGRATION LEVEL DETERMINED AS FUNCTION OF PRE-EXPOSURE AMBIENT SCENE LIGHT DETECT

BACKGROUND OF THE INVENTION

1. Field of the Invention

This invention relates generally to a photographic exposure control system and, more particularly, to a photographic exposure control system where the scene light is integrated during the exposure to a level determined as a function of a pre-exposure ambient scene light detection.

2. Description of the Prior Art

Automatic light responsive exposure control systems as well known in the photographic arts and have been long used to control the duration of a photographic exposure. Such exposure control systems are generally utilized to control a shutter blade assembly which is movable along a predetermined path between a first position precluding scene light from reaching a film plane and a second position defining a maximum size aperture thereby defining a progression of gradually increasing aperture sizes. It is often desirable to alter the operating characteristics of an exposure control system when used in conjunctionn with a source of artificial illumination as is more fully disclosed in U.S. Pat. No. 3,200,723, entitled "Shutter Timing Apparatus", by J. M. Topaz, issued Aug. 17, 1965. The operating characteristics of the exposure control system of Topaz are changed during a flash mode of operation to reduce exposure errors which would otherwise occur as a result of the exposure control system being calibrated to operate properly under ambient conditions when the scene illumination is of substantially constant intensity. Thus, when the exposure duration is controlled by a light integrating control circuit, selectively operable means are provided to reduce the amount of light required to trigger the circuit to cause termination of the exposure thereby reducing or eliminating errors in the amount of light which is allowed to impinge upon the film where the scene is illuminated by photoflash apparatus.

Apart from the obvious difficulties in reconciling ambient and flash exposure control resulting in differences between the uniform light intensity encountered during ambient mode operation and the varying light intensity encountered during flash mode operation, other difficulties arise as a result of the operational changes in the shutter assembly between ambient and flash operation. For instance, in a two-bladed shutter assembly of the scanning type, the command trigger signal from the light integrating control circuit to terminate the exposure interval is generally received while the shutter blade elements are moving in a direction of progressively increasing effective aperture size. Thus, the forward momentum of the shutter assembly must be overcome before the blades can start to return to their closed position. Hence, a considerable overshoot is experienced where the effective aperture defined by the shutter assembly primary apertures increases beyond its value at the time that the command trigger signal is received from the light integrating circuit. Such an overshoot in the effective aperture defined by the shutter blade elements may be easily anticipated in a well-known manner by configuring the photocell sweep apertures to move ahead of the shutter blade primary apertures. However, in the flash mode of operation where a source of artificial illumination is utilized, the shutter blade elements generally reach their maximum effective aperture defining position as determined by the follow focus system prior to receipt of the command signal to terminate the exposure interval. Hence, the shutter blade elements are already at rest at the follow focus setting when the command signal to terminate the exposure interval is received and thus the shutter blade elements do not overshoot their aperture defining position at the time of receipt of the command signal. Hence, the built-in anticipation for the ambient mode of operation becomes incompatible with the flash mode of operation to provide an adequate film exposure.

In photographic camera systems wherein a detachable source of artificial illumination such as a flash bulb is utilized, the difficulty has been solved in a manner as is fully described in U.S. Pat. No. 4,008,481, entitled "Exposure Control System with Separate Flash and Ambient Trigger Levels", by George D. Whiteside, issued Feb. 15, 1977, in common assignment herewith wherein the trigger level to which the scene light is integrated during the exposure interval is varied as a direct function of the insertion or with removal of the flash array from the camera apparatus. However, in newer photographic camera systems wherein an electronic flash may be an integral part of the photographic camera apparatus, it may be undesirable to require the photographer to actuate a button or like device just to vary the exposure level at which the shutter blades are commanded to close particularly where it is anticipated that the strobe may be utilized both under conditions of low ambient scene light intensity to provide the major portion of the scene illumination and under conditions of high ambient scene light intensity where the strobe may be utilized only to provide fill in flash in order to highlight shadows. In addition, it may become desirable to provide a plurality of different trigger levels by which to command the shutter blades to close in accordance with a predetermined exposure program.

Therefore, it is a primary object of this invention to provide an exposure control system for controlling the duration of an exposure interval as a predetermined function of both the ambient scene light detected prior to the exposure interval and the scene light detected during the photographic exposure interval in correspondence with the exposure of the film.

It is a further object of this invention to provide an exposure control system wherein the photographic exposure interval is terminated as a predetermined function of the scene light detected during the exposure interval wherein at least one parameter of the predetermined function is varied as another function of ambient scene light detected prior to the exposure.

Other objects of the invention will in part be obvious and will in part appear hereinafter. The invention accordingly comprises the mechanism and system possessing the construction, combination of elements and arrangement of parts which are exemplifed in the following detailed disclosure.

SUMMARY OF THE INVENTION

A photographic camera apparatus of the type adapted to be energized at least in part by a source of electrical energy including means for defining a film plane comprises a shutter apparatus for admitting scene light to the film plane to define an exposure interval. A photoresponsive element is stationed to receive light from the scene to be photographed both immediately prior to and during the exposure interval in order to provide an output signal having an electrical characteristic which varies as a function of the intensity of light incident thereon. An exposure control system is provided for controlling the duration of the exposure interval by providing an exposure terminating control signal as a predetermined function of the output signal from the photoresponsive element during the exposure interval. At least one parameter of this function by which the exposure terminating control signal is determined is varied as another function of the output signal from the photoresponsive element immediately prior to the exposure interval. In the preferred mode, the exposure control system for controlling the duration of the exposure interval comprises means for integrating the output signal from the photoresponsive element during the exposure interval and for providing a control signal for effecting the termination of the exposure interval in response to the integrated output signal reaching a selected value. In addition, means are provided for varying the selected value of the integrated output signal in response to the output signal provided from the photoresponsive element immediately prior to the exposure interval.

DESCRIPTION OF THE DRAWINGS

The novel features that are considered characteristic of the invention are set forth with particularlity in the appended claims. The invention itself, however, both as to its organization and its method of operation, together with other objects and advantages thereof will be best understood from the following description of the illustrated embodiment when read in connection with the accompanying drawings wherein:

FIG. 1 is a front elevational view of the shutter blade mechanism of this invention;

FIG. 2 is a front elevational view of the shutter blade mechanism of FIG. 1 at a different position from that of FIG. 1;

FIG. 3 is a front elevational view of the shutter blade mechanism of FIG. 1 at still another position from that of FIGS. 1 and 2;

FIG. 4 is a front elevational view of the shutter blade mechanism of FIG. 1 in still another position from that of FIGS. 1, 2 and 3;

FIG. 8c is a graphical representation of the light intensity incident to the film plane versus time for the predominantly ambient mode exposure interval of FIG. 8a;

FIG. 9c is a graphical representation of the light intensity incident to the film plane versus time for the artificial illumination mode exposure interval of FIG. 9a.

DESCRIPTION OF THE PREFERRED EMBODIMENTS

Figure 5:
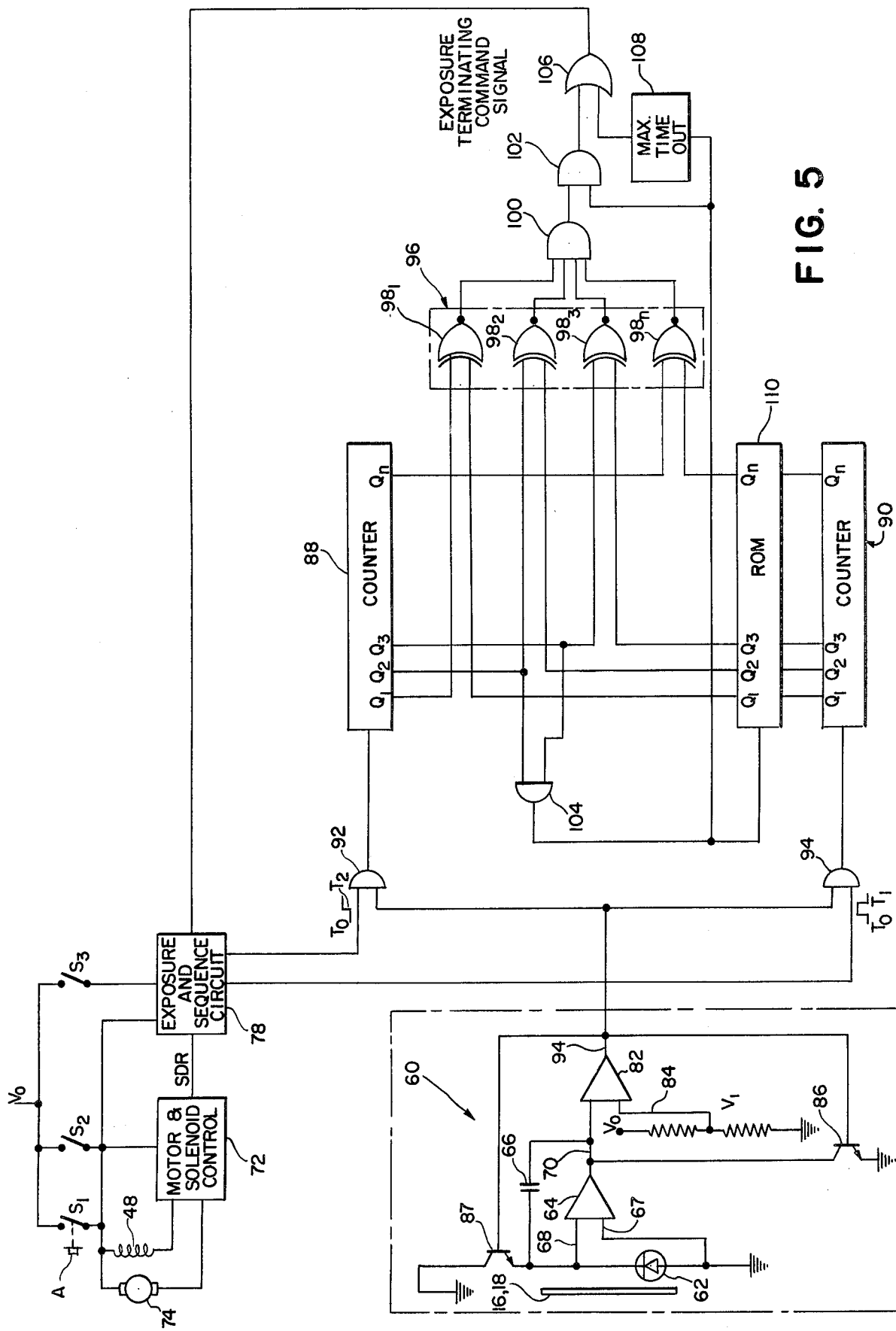
FIG. 5 is an electrical schematic view of a preferred embodiment for the exposure control circuit of this invention.

Referring now to FIGS. 1 through 4, there are shown generally at 10 a photographic exposure control shutter apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens (not shown) can be provided in overlying relation with respect to the light entry opening 14. Image carrying light rays from the objective lens which are transmitted by the shutter apparatus 10 in a manner to be subsequently described are thereafter directed to a rearwardly positioned film plane (not shown) by way of a reflecting mirror (also not shown) all of which are stationed within a suitable light-tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by Bruce K. Johnson et al., issued Aug. 2, 1977, in common assignment herewith and now incorporated by reference herein.

The exposure control shutter apparatus 10 comprises two overlapping shutter blade elements 16 and 18 of the so-called "scanning type" which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera With Pivoting Blades", by George D. Whiteside, issued Mar. 2, 1977, in common assignment herewith and now incorporated by reference herein. The apertures 20 and 22 are selectively fitted so as to overlap the light entry exposure opening 14 thereby defining a gradually varying effective aperture size as a function of the position of the blade elements 16 and 18.

Each of the blades 16 and 18 may additionally be configured to have corresponding photocell sweep secondary apertures shown, respectively, at 24 and 26. The photocell sweep secondary apertures 24 and 26 may be configured to track in a predetermined corresponding relationship with respect to the scene light admitting primary apertures 20 and 22 in a manner as will be more fully described in the following discussion. As is readily apparent, the photocell sweep secondary apertures 24 and 26 move in the same manner as the primary apertures 20 and 22 to define a small secondary effective aperture for admitting the passage of scene light transmitted to a photoresponsive element 62 (see FIG. 5) from the scene being photographed. The blades 16 and 18 also include, respectively, a third pair of first light detect apertures 30 and 32 which operate in a manner to be subsequently described to admit light from a source of artificial illumination such as an LED (not shown) to the photoresponsive element 62 in coincidence with the first scene light admitted to the film plane when the primary apertures 20 and 22 initially overlap at the commencement of an exposure interval as fully described in U.S. Pat. No. 4,192,587, entitled "Proportional Fill Flash", by Arthur G. LaRocque, issued Mar. 11, 1980, in common assignment herewith and now incorporated by reference herein. The shutter blade elements 16 and 18 also include a fourth pair of pre-exposure ambient scene light detect apertures 31 and 33 which operate in the manner of this invention to direct scene light to the photoresponsive element 62 for a select period of time prior to the commencement of the exposure interval.

Projecting from the baseblock casting 12 at a location spaced laterally apart from the light entry exposure opening 14 is a pivot pin or stud 34 which pivotally and translatably engages elongate slots 36, 38 formed in respective shutter blade elements 16 and 18. Pin 34 may be integrally formed with the baseblock casting 12 and blade elements 16 and 18 may be retained in engaging relation with respect to the pin 34 by any suitable means such as peening over the outside end of the pin 34.

The opposite ends of the blade elements 16 and 18 respectively include extended portions which pivotally connect to a walking beam 40. The walking beam 40, in turn, is disposed for rotation relative to the baseblock casting 12 by pivotal connection to a projecting pivot pin or stud 42 which may be integrally formed with a baseblock casting 12 at a location spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46 which extend laterally outward from the walking beam 40. Pin members 44 and 45 are preferably circular in cross section and extend through respective circular openings in respective shutter blade elements 16 and 18. Thus, the shutter blade elements 16 and 18 provide a blade mechanism with a means for mounting the blade mechanism for movement being provided by the walking beam 40 together with the pivot pin 34.

Drive means are provided for displacing the blade mechanism and include a tractive electromagnetic device in the form of a solenoid 48 employed to displace the shutter blades 16 and 18 with respect to each other in the baseblock casting 12. The solenoid 48 includes an internally disposed cylindrical plunger unit 50 which retracts inwardly into the body of the solenoid upon energization of the solenoid winding. A solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,942,183, supra. Thus, with the spring connection herein described, the exposure control apparatus 10 is biased to continuously urge the shutter blade elements 16 and 18 into an open scene light unblocking orientation as shown in FIG. 4.

In the present arrangement, the shutter blades 16 and 18 are drawn from their scene light unblocking open arrangement as shown in FIG. 4 to their scene light blocking closed arrangement as shown in FIGS. 1 and 2 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally open position. However, since in the preferred embodiment the shutter blade elements 16 and 18 are spring biased to move toward their scene light unblocking arrangement, it would otherwise be necessary to maintain the solenoid in a state of constant energization in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 46, there is provided a latch mechanism (not shown) which operates normally to latch the shutter blade mechanism in its scene light blocking position as shown in FIG. 1 and which automatically unlatches the shutter blade mechanism to permit the shutter blade elements 16 and 18 to be moved to their scene light unblocking position as shown in FIG. 4 in order to provide a photographic exposure interval and which further automatically responds at the termination of an exposure cycle to relatch the blade elements 16 and 18 in their scene light blocking position so as to permit deenergization of the solenoid 48. The manner in which the aforementioned latch operates is more fully described in U.S. Pat. No. 4,040,072, supra.

Referring now to FIG. 5, there is shown a schematic circuit diagram for the exposure control system of this invention. As shown generally at 60, there is provided a scene light detecting and integrating circuit comprising the photoresponsive element 62 connected across the input terminals 67 and 68 of an operational amplifier 64 of the differential variety. When considered ideally, the amplifier 64 has an infinite gain and an infinite input impedance and a zero output impedance. The input circuit of the amplifier 64, however, is structured such that the apparent input impedance for the photoresponsive element 62 is substantially zero, thereby functioning in a manner which permits the photoresponsive element 62 to operate in a current mode. Consequently, the current generated by the photoresponsive element 62 is limited substantially only to its own internal impedance. To accomplish this effect, a feedback integration capacitor 66 is connected between one input terminal 68 of the operational amplifier 64 and an output terminal 70 from the operational amplifier 64.

With the integration and feedback arrangement herein described, any difference of potentials supplied by the photoresponsive element 62 across input terminals 67 and 68 will operate to cause a current of opposite polarity to be produced through feedback integration capacitor 66. As a consequence, the feedback integration capacitor 66 provides a substantially instantaneous feedback signal of opposite polarity which serves to counteract any differential signal voltage impressed by the photoresponsive element 62 across the input terminals 67 and 68. Thus, although the amplifier 64 has a very high input impedance, the photoresponsive element 62, when connected in the aforementioned manner, experiences only a very low input impedance to the amplifier 64. Therefore, the current output of the photoresponsive element 62 is directed into the feedback integration capacitor 66. In this manner, the photoresponsive element 62 is connected to operate in a constant current mode of operation under conditions of nonvarying scene light intensity to provide a substantially linear output response at output terminal 70 as is more fully described in U.S. Pat. No. 3,620,143, entitled "Automatic Exposure Control System With Fast Linear Response", by John P. Burgarella, issued Nov. 16, 1971, in common assignment therewith and now incorporated by reference herein in its entirety.

The exposure control circuitry herein described preferably derives power from a battery that is insertable within the camera in correspondence with a film pack or cassette in a manner that is well known in the art for Polaroid SX-70 type film cassettes and cameras. The aforementioned film cassette battery is preferably utilized to power the circuitry in FIG. 5 in its entirety by way of three switches $S_1$, $S_2$ and $S_3$ in a manner as is more fully described in U.S. Pat. No. 4,040,072, supra. The exposure control circuitry of FIG. 5 also includes a motor and solenoid control circuit 72 which operates in a manner as is again more fully described in U.S. Pat. No. 4,040,072, supra. to control the energizing current delivered to the solenoid 48 and to a motor 78. The film units intended for use with the camera of this invention are preferably of the self-developing type, and the motor 74 is provided to effect the advancement and processing of the self-developing film units in a well-known manner.

The photographic apparatus may also include an electronic flash or strobe (not shown) which is powered and fired in a manner as is fully described in U.S. Pat. No. 4,192,587, supra.

Figure 6:
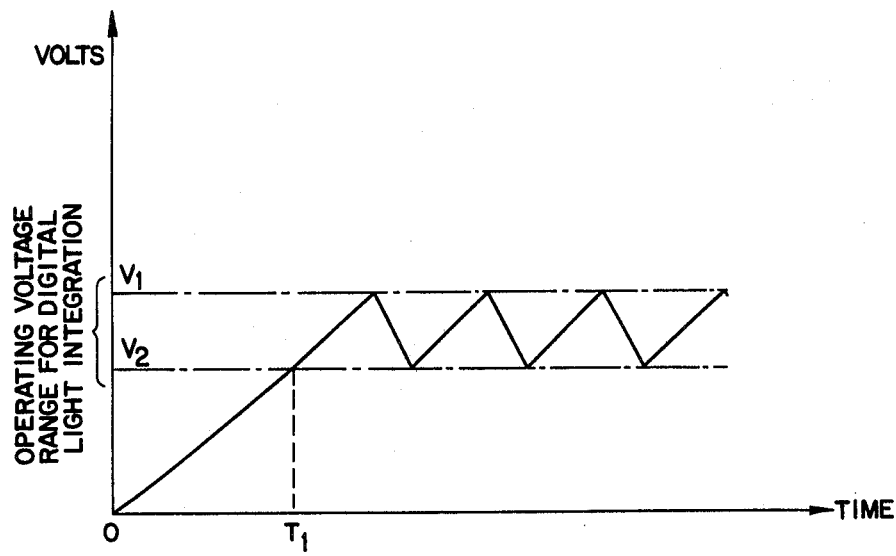
FIG. 6 is a graphical representation of the output signal level of a light integrating circuit as shown in FIG. 5.
Figure 7:
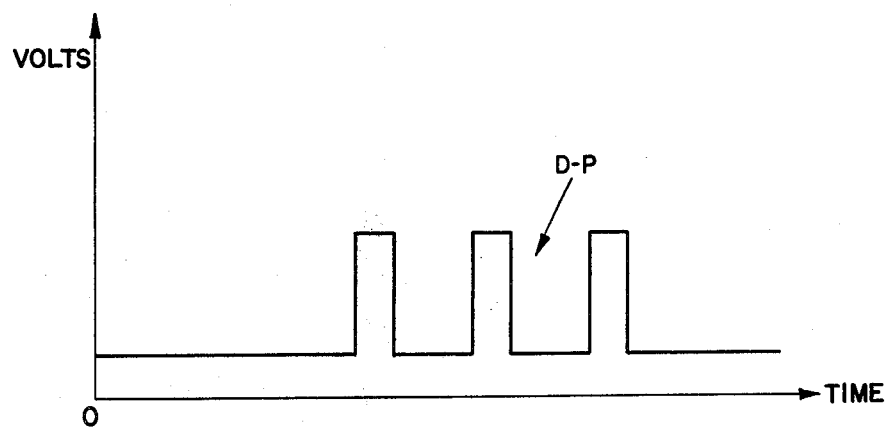
FIG. 7 is a graphical representation of the output signal wave form from a comparator circuit in FIG. 5.

The scene light integrating circuit 60 responds to incident light to provide an integrated output response as shown in FIG. 6. The integrated output response along output line 70 is directed to an input terminal of a comparator 82 which operates to compare the integrated voltage signal level along line 70 with a select reference voltage signal level $V_1$ as derived from input line 84. When the ouput voltage signal level from the integrating circuit 60 along line 70 reaches a selected reference signal level $V_1$ along line 84, the comparator 82 switches from a low (binary logic 0) output signal level to an assertive (binary logic 1) output signal level along output line 94 to drive an NPN transistor 86 into saturation and thereby discharge the feedback integration capacitor 66. Additionally, an NPN transistor 87 connected in reverse operating mode is simultaneously turned on to divert current from the photoresponsive element 62. The output signal level from the integrating circuit 60 discharges to a selected voltage value $V_2$ below the selected reference voltage $V_1$ as shown in FIG. 6 whereupon the comparator 82 switches back to provide a low (binary logic 0) output signal level to turn off the transistor 86 and allow the integration circuit 60 to resume integrating back to the select reference voltage signal level $V_1$. A comparator 82 and light integrating circuit 60 continue to cycle in the aforementioned manner between the selected reference voltage $V_1$ and the selected value below the reference voltage $V_2$ as a result of the hysteresis associated with the comparator 82 to provide a saw tooth output signal along line 70 as shown in FIG. 6. The output signal from the comparator 82 at line 94, in turn, approximates a digital pulse train DP as shown in FIG. 7 wherein the frequency of the digital pulse train represents the integration of light detected by the photoresponsive element 62.

The digital pulse train DP, in turn, is directed to a pair of binary integration counters 88 and 90 by way respectively of a pair of AND gates 92 and 94. The AND gates 92, 94 are gated from an exposure and sequencing circuit as shown at 78 in a manner to be more fully described in the following discussion. The binary counters 88 and 90 provide respectively binary count output signals from output terminals $Q_l$ through $Q_n$ representative of the pulses of the digital pulse train DP received from output line 94 of comparator 82. The binary count output signal from the counter 90 is directed to a read only memory ROM 110 which, in turn, provides a binary count output signal bearing a predetermined functional relationship to the binary count output signal received from the counter 90. The binary count output signals at corresponding output terminals $Q_1$ through $Q_n$ of the counter 88 and ROM 110 are directed respectively for comparison by a comparator 96 comprising a plurality of exclusive NOR gates $98_l$ through $98_n$. Each exclusive NOR gate provides a high (binary logic 1) output signal level upon detecting a matched signal condition from corresponding Q output terminals in the counter 88 and ROM 110.

The output signals from the exclusive NOR gates $98_l$ through $98_n$, in turn, are directed to an AND gate 100, the output from which is directed to one input terminal of an AND gate 102. The other input terminal to the AND gate 102 receives an output signal from an AND gate 104 which is arranged to decode the counter 88 upon the initial detection of light at the commencement of an exposure interval in a manner to be more fully described in the following discussion. The output from the AND gate 102, in turn, is directed to one input terminal of an OR gate 106, the other input terminal of which receives an input signal from a maximum time out circuit as shown at 108 which is triggered to commence timing the maximum permissible duration for the exposure interval by the output signal received from the AND gate 104 at the commencement of the exposure interval. The output signal from the OR gate 106 is thereafter directed to the exposure and sequence circuit 78 to provide an exposure terminating command signal in the manner of this invention.

When the electronic flash is fully charged, a photographer may initiate a photographic exposure cycle by manually actuating a button A so as to close the switch $S_1$ in a manner as more fully described in U.S. Pat. No. 4,040,072, supra. Closure of the switch $S_1$, in turn, signals the exposure and sequencing circuit 78 in a manner as is again more fully disclosed in U.S. Pat. No. 4,192,587, supra. to provide a high (binary logic 1) solenoid drive signal along output line SDR to the motor and solenoid control circuit 72 so as to energize the solenoid 48 and retract the plunger 50 inwardly to rotate the walking beam 40 in a counterclockwise direction from its position as shown in FIG. 1 to its position as shown in FIG. 2. This limited counterclockwise movement of the walking beam 40 operates to effect a release of a latch mechanism (not shown) while simultaneously effecting the closure of the switches $S_2$ and $S_3$ in a manner as is again more fully described in U.S. Pat. No. 4,040,072, supra.

A high (binary logic 1) output signal from the exposure and sequencing circuit 78 operates in a well-known manner to clear the counter 88 so that all the output signals therefrom go to low (binary logic 0) output signal levels and preset the counter 90 to provide a select binary count output signal therefrom for reasons which will become apparent from the following discussion. Closure of the switch $S_3$ also operates to provide a logic signal by way of the exposure and sequencing circuit 78 to power the solenoid 48 from an initial high current energization condition required to retract the plunger 50 to a low current energization condition required to temporarily hold the plunger in its retracted position as shown in FIG. 2. The powering down of the solenoid 48 to a holding current mode may be accomplished in a manner as is fully described in U.S. Pat. No. 4,192,587, supra.

As is now readily apparent, when the shutter blade elements 16 and 18 are driven to the extreme counterclockwise walking beam position as shown in FIG. 2, the pre-exposure ambient scene light detect apertures 31 and 33 overlap to admit scene light to the photoresponsive element 62 and the scene light integrating circuit 60 responds to the incident light from the scene in the aforementioned manner to provide the digital pulse train DP. The exposure and sequencing circuit 78 also simultaneously provides a high (binary logic 1) output signal level to one input terminal of the AND gate 94 so as to gate the digital pulse train DP into the binary counter 90. The exposure and sequencing circuit 78 also simultaneously provides a low (binary logic 0) input signal level to the AND gate 92 so as to disable the AND gate 92 from gating the digital pulse train DP to the counter 88. The counter 90 thereafter counts down the individual pulses in the digital pulse train DP from the aforementioned preset count to provide a binary count output signal along output terminals $Q_l$ through $Q_n$ which is thereafter directed to the ROM 110.

The AND gate 94 is enabled by the exposure and sequencing circuit 78 to gate the digital pulse train DP to the binary counter 90 for only a select period of time as, for example, from $T_0$ to $T_1$ to provide a pre-exposure ambient scene light measurement prior to the commencement of the exposure interval. Subsequent to the pre-exposure ambient scene light measurement, the motor and solenoid control circuit 72 may be signalled in a manner as is more fully described in U.S. Pat. No. 4,192,587, supra. to deenergize the solenoid 48 and release the shutter blade elements 16 and 18 to move toward the position as shown in FIG. 3 to commence an exposure interval. Although the pre-exposure ambient scene light measurement has been described as being made with the shutter blade elements 16 and 18 at rest in the position as shown in FIG. 2, it will be readily understood that the pre-exposure ambient scene light measurement could also be made subsequent to the deenergization of the solenoid 48 and release of the shutter blade elements 16 and 18 in the predetermined time from $T_0$ to $T_1$ before the pre-exposure ambient scene light detect apertures 31 and 33 move out of overlapping relation with respect to each other.

As is readily apparent, movement of the shutter blade elements 16 and 18 from the position as shown in FIG. 2 to the position as shown in FIG. 3 operates to move the pre-exposure ambient scene light detect apertures 31 and 33 out of overlapping relationship with respect to each other so as to block the scene light from reaching the photoresponsive element 62 prior to the commencement of the exposure interval. After the pre-exposure ambient scene light detect apertures 31 and 33 move out of overlapping relationship with respect to each other, there is provided at $T_2$ by the exposure and sequencing circuit 78 a high (binary logic 1) input signal level to enable the AND gate 92 to gate the digital pulse train DP to the counter 88 immediately prior to the commencement of the exposure interval.

Referring specifically to FIG. 3, it can be seen that the primary apertures are just beginning to overlap to admit scene light to the film plane at the same instant that the first light detect apertures 30 and 32 also begin to overlap to admit artificial light from the LED (not shown) to the photoresponsive element 62 in the manner as more fully described in U.S. Pat. No. 4,192,587, supra. The photocell sweep secondary apertures 24 and 26 also begin to overlap in general correspondence with the primary apertures 20 and 22 to admit scene light to the photoresponsive element 62 in a well-known manner. The light admitted by the first light detect apertures 30 and 32 is detected by the photoresponsive element 62 and thereafter integrated by the circuit 60 to provide the digital pulse train DP which is directed to the counter 88 by way of the AND gate 92. As is readily apparent, the exposure and sequencing circuit 78 maintains a low (binary logic 0) output signal level to disable the AND gate 94 from directing the digital pulse train to the counter 90 during the exposure interval.

The counter 88 counts the individual pulses of the digital pulse train DP and is thereafter decoded at output terminals $Q_2$ and $Q_3$ by AND gate 104 which switches to provide a high (binary logic 1) output signal level to simultaneously enable the ROM 110 to receive the binary count output signal from the counter 90, enable the AND gate 102 to gate the shutter close command signal in a manner to be subsequently described, and trigger the maximum exposure interval time out circuit 108 to initiate timing the maximum exposure interval to be allowed. In this manner, the AND gate 104 is gated to provide a high (binary logic 1) output signal level in correspondence with the initial overlap of the primary apertures 20 and 22 so as to signal the commencement of the exposure interval.

The shutter blade elements 16 and 18 thereafter continue to move toward the maximum aperture defining position as shown in FIG. 2 with the frequency of the digital pulse train at output line 94 from comparator 82 representing the integration of scene light detected by the photoresponsive element 62 by way of the photocell sweep secondary apertures 24 and 26. Thus, the counter 88 continues to count the individual pulses from the pulse train until the binary count output signal therefrom matches the binary count output signal from the ROM 110 at which instant all the exclusive NOR gates $98_1$ through $98_n$ of the comparator 96 provide positive (binary logic 1) input signals to switch the AND gate 100 and provide a positive (binary logic 1) input signal level to the AND gate 102. The other input terminal to the AND gate 102 is already at a positive (binary logic 1) input signal level as a result of the aforementioned detection at the commencement of the exposure interval and thus switches to provide a positive (binary logic 1) input signal level to the OR gate 106 so as to switch the output therefrom to provide a positive (binary logic 1) exposure terminating command signal to the exposure and sequence control circuit 78. The exposure and sequence control circuit 78, in turn, provides a high (binary logic 1) output signal level along line SDR to signal the motor and solenoid control circuit 72 to energize the solenoid 48 and retract the plunger 50 therein to rotate the walking beam 40 in a counterclockwise direction and drive the shutter blade elements 16 and 18 back to their scene light blocking position as shown in FIG. 1.

The frequency of the digital pulse train DP provided during the exposure interval represents the integral of the output signal from the photoresponsive element 62, and the individual pulses from the digital pulse train DP are counted by the counter 88 until reaching a selected value as determined by the binary count output signal from the ROM 110 at which time the comparator 96 switches to provide the exposure terminating command signal. In the event that there is insufficient scene light intensity to provide a sufficient number of pulses in the digital pulse train DP for the binary count output signal from the counter 88 to reach the binary count output signal from the ROM 110, within the maximum allowable time desired for an exposure interval, there will be provided a positive (binary logic 1) output signal from the maximum time out circuit 108 to switch the OR gate 106 to provide the exposure terminating command signal.

Thus, the level to which the integrator 60 is allowed to integrate during the exposure interval as represented by the binary count output signal from the counter 88 is determined by the amount of ambient scene light detected prior to the exposure interval as represented by the binary count output signal from the counter 90. The ROM 110 thereafter receives the binary count output signal from the counter 90 to provide the integration level determining binary count output signal as a predetermined function of the binary count output signal received from the counter 90. Whereas the counter 90 counts down from a predetermined count, it becomes readily apparent that the predetermined level to which the scene light is integrated during the exposure interval is inversely proportional to the intensity of the ambient scene light detected prior to the exposure interval.

Figure 8A:
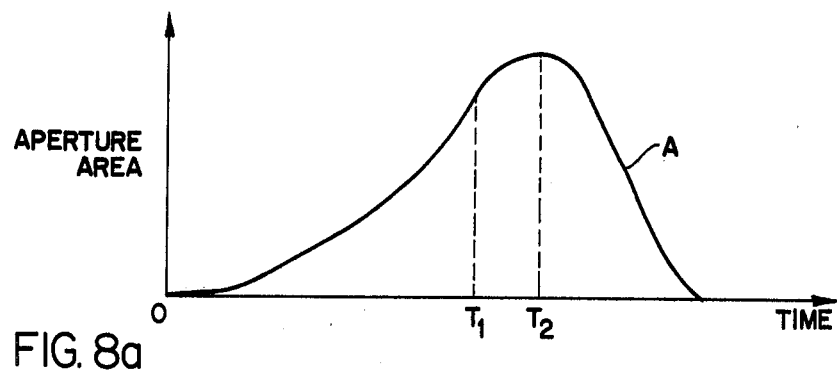
FIG. 8a is a graphical representation of aperture area versus time for a predominantly ambient mode of operation.
Figure 8B:
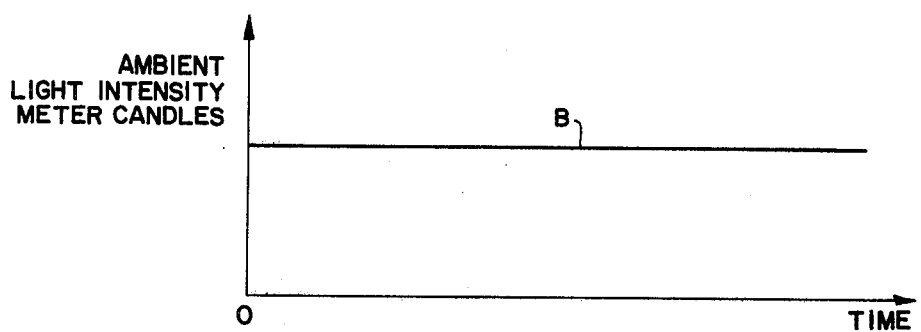
FIG. 8b is a graphical representation of the ambient scene light intensity versus time.

The reasons for this inverse relationship may be best illustrated by way of the following example of the manner in which the ROM 110 may be programmed to provide a predetermined binary count output signal in response to a select number of pulses counted from the digital pulse train DP by the counter 90 during the pre-exposure ambient scene light detect. Referring now to FIG. 8a wherein there is shown the progressive variation in the size of the effective scene light admitting primary aperture as defined by the overlapping apertures 20 and 22 plotted as a function of time, it may be seen that the comparator 96 detects a matched output condition between the counter 88 and the ROM 110 to provide the exposure terminating command signal and energize the solenoid 48 at $T_1$. However, as a result of the forward momentum of the shutter blade elements 16 and 18 as well as the walking beam 40, there elapses a period of time subsequent to $T_1$ before the solenoid 48 exerts sufficient force to stop the shutter blade elements 16 and 18 at time $T_2$. Once the opening momentum of the shutter blade elements 16 and 18 is overcome to stop the blades, there is a further time period after $T_2$ during which the shutter blade elements are returned to their closed position as shown in FIG. 8a. Where the ambient scene light intensity remains substantially constant as shown by curve B in FIG. 8b and is sufficiently high to effect an acceptable photographic exposure interval without artificial illumination other than that fill-in flash which may be provided to fill-in shadows, then the actual exposure as shown by curve C in FIG. 8c where the axis of ordinates is calibrated in meter candles and the axis of abscissa is calibrated in units of time, incurs a considerable error as indicated by the cross hatched area enveloped by the curve C subsequent to time $T_1$. As is readily apparent, the exposure error is due first to the overshoot of the shutter blade elements 16 and 18 subsequent to time $T_1$ before their opening momentum can be overcome at time $T_2$ and secondly to the time required for the shutter blade elements to be returned to their closed position after time $T_2$.

This exposure error is readily predictable and may be overcome in a well-known manner by configuring the photocell sweep secondary apertures 24 and 26 to progressively open ahead of the primary apertures 20 and 22 so as to prematurely reach a matched condition in the binary count output signals between the counter 88 and ROM 110 thereby providing the exposure terminating command signal prior to the time at which the film is fully exposed. Thus, the additional film exposure resulting from the shutter blade overshoot and blade closing time may be anticipated in the foregoing manner by prematurely triggering the shutter blades 16 and 18 to close prior to the time required for full exposure of the film as is readily apparent.

Figure 9A:
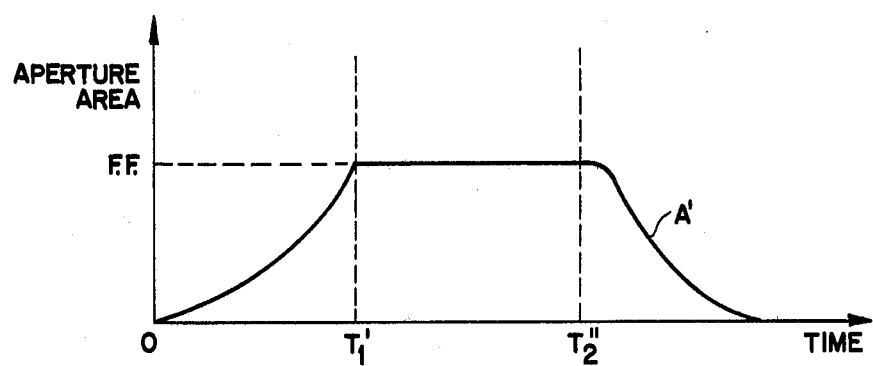
FIG. 9a is a graphical representation of aperture area versus time for the artificial illumination mode of operation.

Under conditions where the ambient scene light is insufficient to provide an adequate film exposure, the electronic flash must be utilized to provide artificial scene light. Referring now to FIG. 9a, there is shown a graphical representation at A' of the progressively changing effective primary aperture area during the flash mode of operation where the axis of ordinates is calibrated in units of area while the axis of abscissa is calibrated in units of time. Under conditions of low ambient scene light intensity, the walking beam 40 rotates in a clockwise direction to its maximum effective aperture defining position as shown in FIG. 4 or as by be limited by a follow focus intercept of the type described in U.S. Pat. No. 4,008,481, entitled "Exposure Control System With Separate Flash and Ambient Trigger Levels", by G. D. Whiteside, issued Feb. 15, 1977, in common assignment herewith and now incorporated by reference herein, prior to the strobe being fired. The shutter blade elements 16 and 18 are thus normally at rest when the strobe is fired and prior to the counter 88 reaching the required level to provide the exposure terminating command signal. Since the forward momentum of the shutter blade elements 16 and 18 as well as the walking beam 40 neet not be overcome in the normal flash mode of operation, it will be appreciated that the shutter blade elements immediately start to return to the closed position when the solenoid 48 is energized at time $T_2''$. Thus, the shutter blade elements 16 and 18 do not overshoot their maximum effective aperture area after the comparator 96 gates the AND gate 100 to provide the exposure terminating command signal as they do in FIG. 8a for the ambient mode of operation.

Figure 8C:
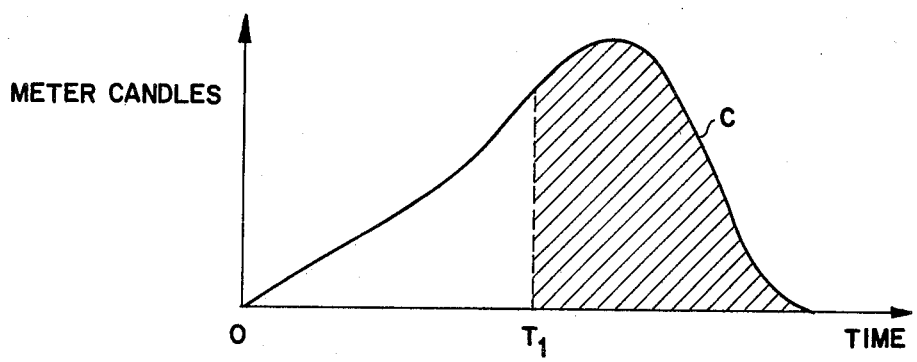
Figure 9B:
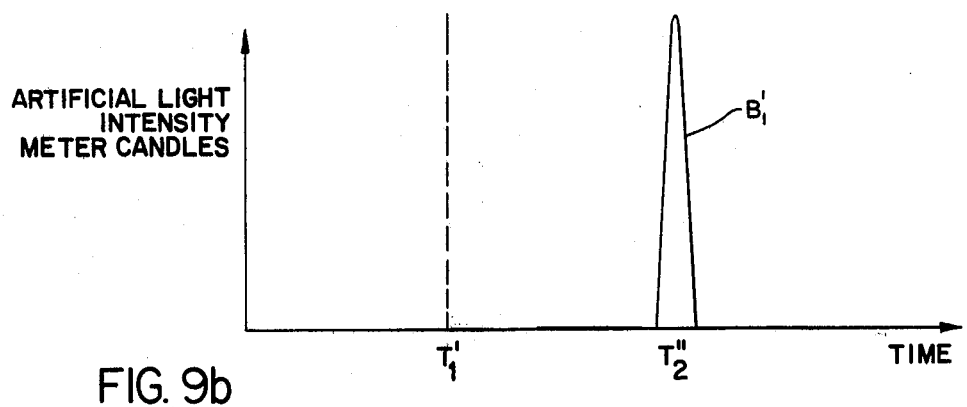
FIG. 9b is a graphical representation of the artificial scene light intensity versus time.
Figure 9C:
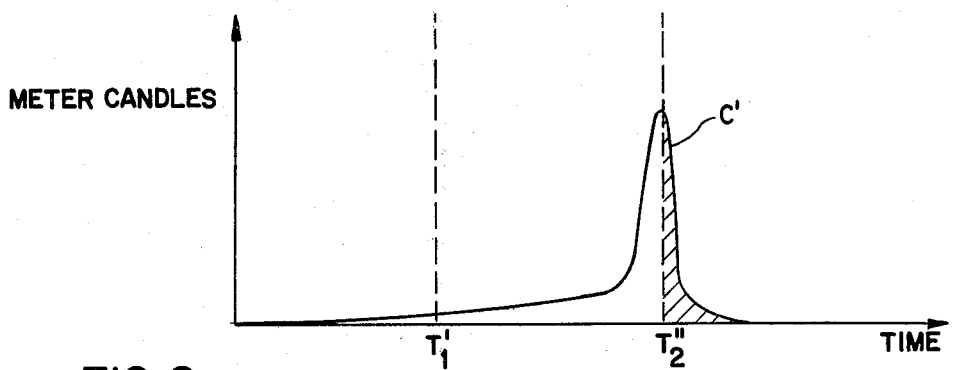

Referring now to FIG. 9b, there is shown a graphical representation at B' of the variation in the intensity of artificial light with respect to time in a scene illuminated by a strobe. The strobe may be triggered to illuminate at some predetermined time delay subsequent to the commencement of the exposure interval. As will be readily understood, the time delay is generally sufficient to permit the shutter blade elements 16 and 18 to reach their maximum effective aperture defining position as shown in FIG. 9a. The exposure terminating command signal at time $T_2''$ to energize the solenoid 48 and close the shutter blade elements 16 and 18 will generally occur subsequent to the extinguishment of the strobe light which is very short in duration in comparison to the duration of the exposure interval. Referring now to FIG. 9c, there is shown at C' the graphical representation of the actual film exposure where the axis of ordinates is calibrated in meter-candles and the axis of abscissa is calibrated in units of time. As is readily apparent, the area enveloped by the exposure curve C' subsequent to the exposure terminating command signal at time $T_2''$ represents a substantially small portion of the entire area enveloped by the exposure curve C when compared with the exposure curve C for the ambient mode of operation as shown in FIG. 8c.

Thus, the built-in anticipation of the photocell sweep secondary apertures 24 and 26 would result in a premature termination of the exposure interval in the flash mode. As is now readily apparent, this results partly from the fact that the shutter blade elements 16 and 18 are generally at rest when the exposure terminating command signal is received at time $T_2''$ to return the shutter blade elements to their scene light blocking position. The shutter blade elements thus do not overshoot their maximum effective aperture defining position at time $T_2''$ which has the effect of substantially decreasing the overall exposure subsequent to time $T_2''$ when compared with the ambient mode of operation. In addition, as is also readily apparent, the exposure terminating command signal at time $T_2''$ generally occurs subsequent to the extinguishment of the flash of artificial illumination thereby contributing very little to the actual film exposure during the time required to close the shutter blade elements. By comparison, ambient scene light intensity remains substantially constant during the shutter blade closing time and thus will operate to increase the actual film exposure in comparison to the strobe light.

Thus, for the aforementioned reasons, it becomes desirable to decrease the level to which the integration of scene light is allowed to proceed during the exposure interval as determined by the binary count output signal from the ROM 110 under conditions where the scene is illuminated primarily by artificial light. Therefore, under conditions where the ambient scene light is sufficiently low to require that the scene be artificially lit for an acceptable photographic exposure, the binary counter 90 during the pre-exposure detection of ambient scene light provides a binary count output signal above a select level to the ROM 110 which is programmed to provide the higher of two binary count output signals which determines the integration level at which the exposure terminate command signal is generated. Conversely, under conditions where the ambient scene light intensity is above a predetermined level and sufficiently high to provide an adequate photographic exposure without artificial illumination, the binary counter 90 provides a binary count output signal below a predetermined level to the ROM 110 which is programmed to provide the lower of the two binary count output signals which determines the integration level at which the exposure terminating command signal is provided. Thus, the ROM 110 provides a low binary count output signal in response to the pre-exposure detection of ambient scene light intensity above a predetermined level wherein an acceptable photographic exposure may be made without artificial illumination and a high binary count output signal in response to the pre-exposure detection of ambient scene light intensity below a predetermined level wherein an acceptable photographic exposure can be made only with the use of artificial illumination. The foregoing program for the ROM 110 is only one example of how the ROM 110 may be programmed to provide one of two binary count output signals representative of two distinct exposure terminating command signal levels. However, the invention is by no means so limited and there may be any number of ways for those of ordinary skill in the art to program the ROM 110 to provide a binary count output signal level that varies as a desired function of the pre-exposure ambient scene light intensity detected by the number of pulses counted by the counter 90 from the digital pulse train DP.

Other embodiments of the invention, including additions, subtractions, deletions and other modifications of the preferred disclosed embodiments of the invention will be obvious to those skilled in the art and are within the scope of the following claims.

What is claimed is:

1. A photographic camera apparatus of the type adapted to be energized at least in part by a source of electrical energy and including means for defining a film plane comprises:

shutter means for admitting scene light to the film plane to define an exposure interval;

a photoresponsive element stationed to receive light from the scene to be photographed both immediately prior to and during the exposure interval in order to provide an output signal having an electrical characteristic which varies as a function of the intensity of light incident thereon; and exposure control means for controlling the duration of said exposure interval comprising means for integrating the output signal from said photoresponsive element during said exposure interval and for providing a control signal for effecting the termination of said exposure interval in response to the integrated output signal from said photoresponsive element reaching a selected value and for varying said selected value of said integrated output signal in response to the output signal provided from said photoresponsive element immediately prior to said exposure interval.

2. The photographic camera apparatus of claim 1 wherein: said integrating means also operates to integrate the output signal provided from said photoresponsive element immediately prior to said exposure interval and said means for varying said selected value of said integrated output signal is responsive to the output signal from said integrating means immediately prior to said exposure interval.

3. The photographic camera apparatus of claim 2 wherein: said integrated output signal from said integrating means comprises a digital pulse train, said means for varying said selected value of said integrated output signal comprises first means for counting the individual pulses of said digital pulse train immediately prior to said exposure interval and for providing a binary count output signal representative of the pulses of said pulse train so counted, and said means for providing said control signal for effecting the termination of said exposure interval comprises second means for counting the individual pulses of said digital pulse train during said exposure interval and for providing a binary count output signal representative of the pulses of said pulse train so counted and means for comparing the binary count output signals from said first and second means to provide said exposure terminating control signal in response to when the binary count output signals from said first and second means match.

4. The photographic camera apparatus of claim 3 wherein said means for varying said selected value of said integrated output signal also includes logic gating means for directing said digital pulse train output signal from said integrating means to said first means during a select period immediately prior to said exposure interval and said means for providing a control signal for effecting the termination of said exposure interval includes logic gating means for directing said digital pulse train output signal from said integrating means to said second means subsequent to said selected period immediately prior to said exposure interval.

5. The photographic camera apparatus of claim 4 wherein said means for providing a binary count output signal from said first means comprises a read only memory programmed to provide a select binary count output signal in response to a select number of pulses counted from said digital pulse train during said select period immediately prior to said exposure interval.

6. The camera apparatus of claim 5 wherein said programmable read only memory provides a high select binary count output signal in response to the number of pulses counted from said digital pulse train being less than a select number representative of a predetermined level of ambient scene light intensity during said select period immediately prior to said exposure interval and a low select binary count output signal in response to the number of pulses counted from said digital pulse train being more than said select number representative of said predetermined level of ambient scene light intensity during said select period immediately prior to said exposure interval.

7. The photographic apparatus of claim 2 wherein said shutter means comprises a shutter blade mechanism, means for mounting said shutter blade mechanism for displacement from a first arrangement in which said shutter blade mechanism simultaneously permits the admission of scene light to said photoresponsive element and blocks the admission of scene light to the film plane to accommodate the admission of scene light to said photoresponsive element immediately prior to said exposure interval to a second arrangement in which said shutter blade mechanism permits the admission of scene light to both said photoresponsive element and the film plane to define said exposure interval and back to a third arrangement in which said shutter blade mechanism blocks the admission of scene light to the film plane, and drive means for driving said blade mechanism from its said second arrangement back to its said third arrangement to terminate said exposure interval in response to said exposure terminating control signal.

8. The photographic camera apparatus of claim 7 wherein: said integrated output signal from said integrating means comprises a digital pulse train, said means for varying said selected value of said integrated output signal comprises first means for counting the individual pulses of said digital pulse train immediately prior to said exposure interval when said shutter blade mechanism is in its said first arrangement and for providing a binary count output signal representative of the pulses of said pulse train so counted, and said means for providing said exposure terminating control signal comprises second means for counting the individual pulses of said digital pulse train during said exposure interval when said blade mechanism is in its said second arrangement and for providing a binary count output signal representative of the pulses of said pulse train so counted and means for comparing the binary count output signals from said first and second means to provide said exposure terminating control signal to signal said drive means to drive said blade mechanism back to its said third arrangement in response to the binary count output signals from said first and second means matching.

9. The photographic camera apparatus of claim 8 wherein said means for varying said selected value of said integrated output signal also includes logic gating means for directing said digital pulse train output signal from said integrating means to said first means during the period when said blade mechanism is in its first arrangement immediately prior to said exposure interval and said means for providing a control signal for effecting the termination of said exposure interval includes logic gating means for directing said digital pulse train output signal from said integrating means to said second means when said blade mechanism is in its said second arrangement.

10. A photographic camera apparatus of the type adapted to be energized at least in part by a source of electrical energy and including means for defining a film plane comprises:
  a photoresponsive element for providing an output signal having an electrical characteristic which varies as a function of the intensity of light incident thereon;
  a shutter blade mechanism;
  means for mounting said shutter blade mechanism for displacement from a first arrangement in which said shutter blade mechanism simultaneously permits the admission of scene light to said photoresponsive element and blocks the admission of scene light to the film plane to a second arrangement in which said shutter blade mechanism simultaneously blocks the admission of scene light to the film plane and to said photoresponsive element and then to a third arrangement in which said shutter blade mechanism simultaneously permits the admission of scene light to both the film plane and said photoresponsive element to define an exposure interval and then back to a fourth arrangement in which said shutter blade mechanism blocks the admission of scene light to the film plane to terminate the exposure interval; and
  exposure control means for controlling the duration of said exposure interval as a function of the output signals from said photoresponsive element when said blade mechanism is in its said first and third arrangements.

11. The photographic camera apparatus of claim 10 wherein said exposure control means operates to provide an exposure terminating control signal as a predetermined function of the output signal from said photoresponsive element when said blade mechanism is in its said third arrangement and to vary at least one parameter of said function by which said exposure terminating control signal is provided as another function of the output signal from said photoresponsive element when said blade mechanism is in its said first arrangement.

12. A photographic camera apparatus of the type adapted to be energized at least in part by a source of electrical energy and including means for defining a film plane comprises:

shutter means for admitting scene light to the film plane to define an exposure interval;

a photoresponsive element stationed to receive light from the scene to be photographed both immediately prior to and during the exposure interval in order to provide an output signal having an electrical characteristic which varies as a function of the intensity of light incident thereon; and exposure control means for controlling the duration of said exposure interval by providing an exposure terminating control signal as a predetermined function of the output signal from said photoresponsive element during the exposure interval wherein at least one parameter of said function by which said exposure terminating control signal is determined is varied as another function of the output signal from said photoresponsive element immediately prior to the exposure interval.

* * * * *